United States Patent [19]
DeVita

[11] 3,746,492
[45] July 17, 1973

[54] APPARATUS FOR MOLDING FOAMED THERMOPLASTIC ARTICLES

[75] Inventor: William R. DeVita, Matthews, N.C.

[73] Assignee: Structural Foam Products, Inc., Pineville, N.C.

[22] Filed: June 14, 1971

[21] Appl. No.: 152,612

[52] U.S. Cl.............................. 425/244, 425/245
[51] Int. Cl............................................ B28b 1/00
[58] Field of Search....................... 425/244, 245, 4, 425/817

[56] References Cited
UNITED STATES PATENTS

| | | | |
|---|---|---|---|
| 2,478,013 | 8/1949 | Roddy | 425/244 UX |
| 3,516,123 | 6/1970 | Lang et al. | 425/244 X |
| 3,253,303 | 5/1966 | Bradt | 425/244 X |
| 3,535,742 | 10/1970 | Marcus | 425/244 X |
| 3,674,401 | 7/1972 | Annis et al. | 425/244 |

Primary Examiner—H. A. Kilby, Jr.
Attorney—Parrott, Bell, Seltzer, Park and Gibson

[57] ABSTRACT

An apparatus for molding foamed thermoplastic articles and including an extruder for melting a thermoplastic material and conveying it along a path of travel, a mixer positioned in the path of travel for receiving the melted material and mixing a gaseous blowing agent therewith, a plurality of expandable accumulation chambers communicating with the path of travel for receiving the mixture from the mixer, a mold for receiving the mixture from the accumulation chambers, and means for establishing communication between each of the accumulation chambers and the mold. The expandable accumulation chambers each include a translatable piston, and pressure means for applying a first force on each piston to maintain a pressure in the chambers sufficient to preclude premature foaming of the mixture. In order to rapidly force the mixture from each of the accumulation chambers into the mold, the pressure means is adapted to selectively apply a second force of greater intensity than the first force on each of the pistons substantially concurrently with communication being established between the accumulation chambers and the mold. Means are provided for independently adjusting the upper limit of translation for each piston whereby the volume of the accumulation chambers may be varied.

12 Claims, 4 Drawing Figures

United States Patent [19]
DeVita
[11] 3,746,492
[45] July 17, 1973
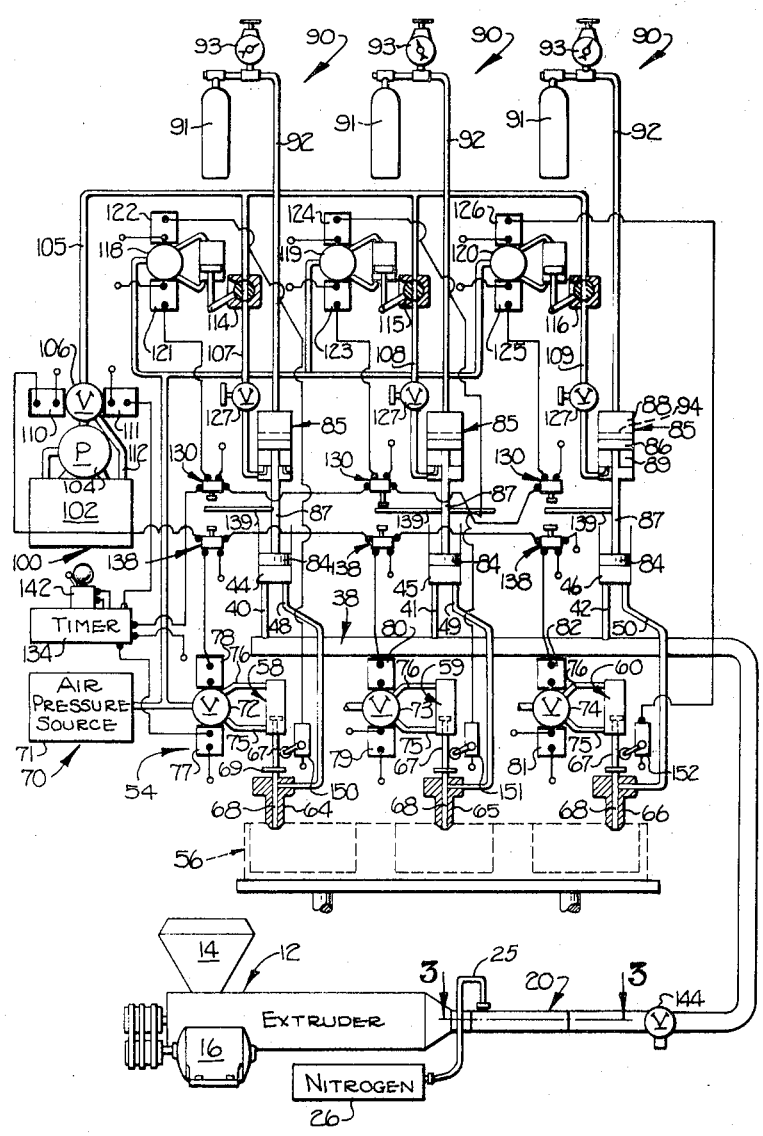

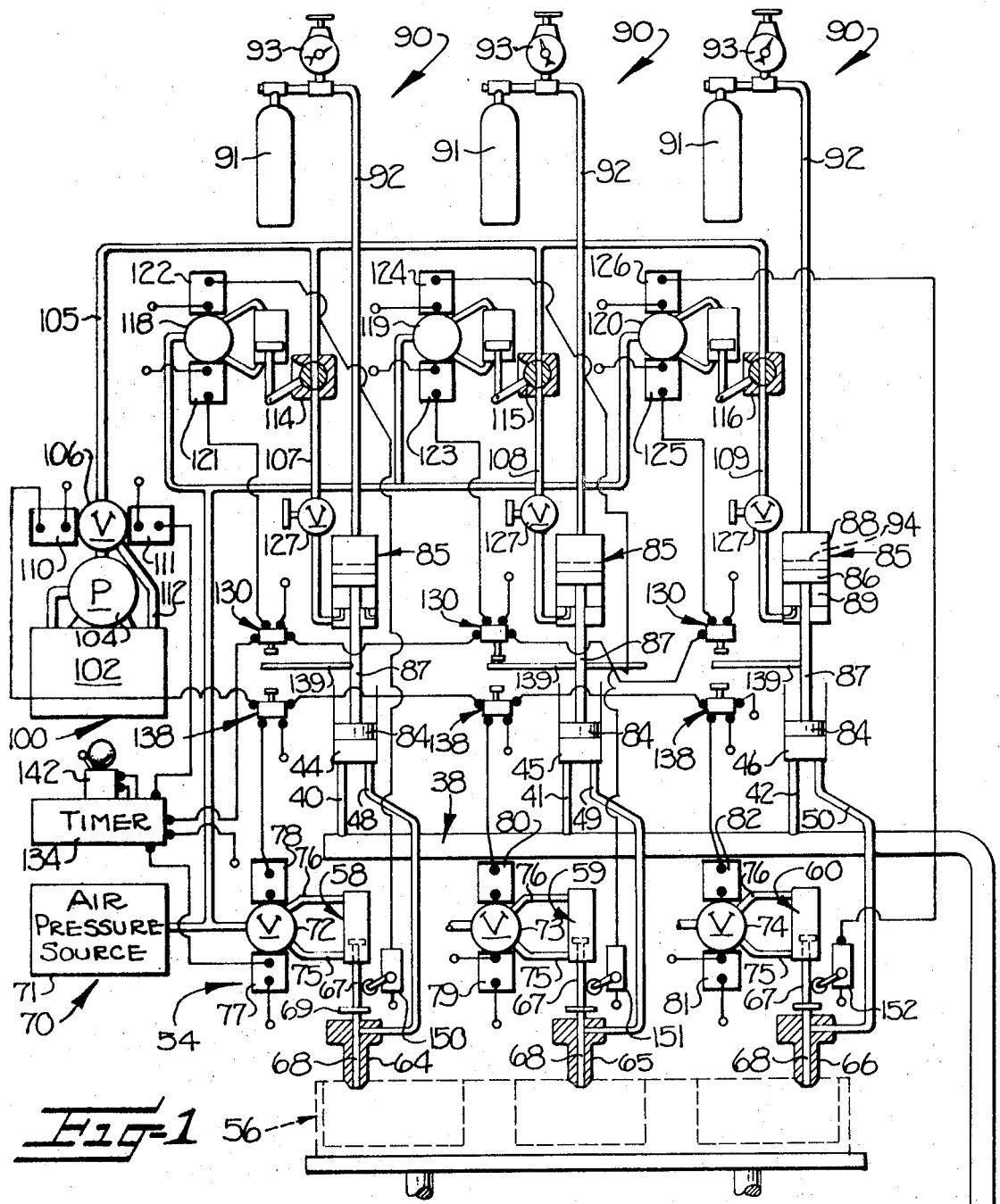
FIG-1
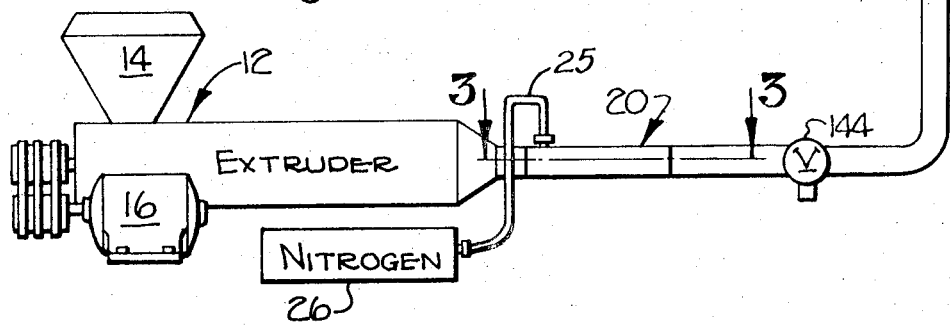

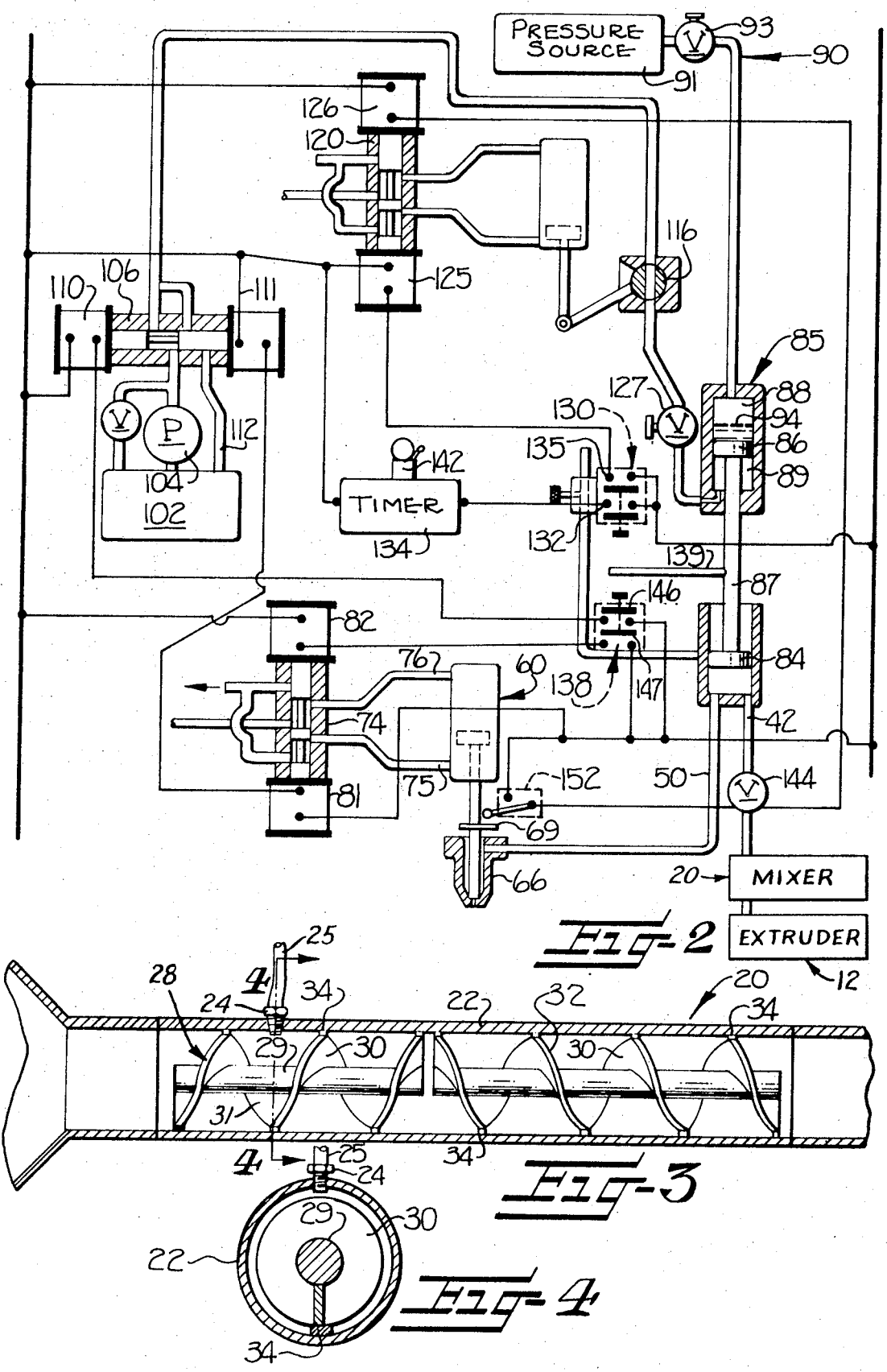

APPARATUS FOR MOLDING FOAMED THERMOPLASTIC ARTICLES

The present invention relates to a method and apparatus for molding foamable thermoplastic materials.

It has been proposed to mold a variety of products utilizing foamable thermoplastic materials by an injection molding technique. More particularly, foamed thermoplastic products have been molded by a process which includes initially melting and mixing a thermoplastic material and a gaseous blowing agent, such as nitrogen, in an extruder. From the extruder, the mixture enters an expanding accumulation chamber having a translatable piston adapted to maintain the mixture under high pressure. When a predetermined charge has been received in the accumulation chamber, a valve to the mold is opened permitting the pressurized mixture to be forced from the accumulation chamber into the mold, the mold being maintained at a reduced or atmospheric pressure. Normally, only enough plastic material to fill a portion of the mold is delivered by the accumulation chamber since the blowing agent expands the material to thereby fill the mold.

Most thermoplastic materials melt at a temperature of about 350°F. or above, and to preclude the premature foaming of the mixture at these high temperatures the extruder and accumulation chamber must maintain the mixture under pressure on the order of about 500 psi. In actual practice however, the extruder and accumulation chamber normally maintain the mixture under a much higher pressure of about 1500–3000 psi to assure sufficiently rapid discharge from the accumulation chamber into the mold.

Parts molded by the above process present several advantages over conventional plastic parts molded from non-foaming material in that the former are essentially stress free, light in weight, and yet they have comparable strength and toughness. However, while the finished product has been generally satisfactory, the process itself has been a source of numerous production difficulties which have severely limited its utility and efficiency. In particular, since the plastic is maintained at a pressure of about 1500–3000 psi in the extruder, the nitrogen blowing agent must be injected at a similarly high pressure in order to get the nitrogen into the extruder and thoroughly mixed with the plastic. To obtain these pressures, either highly pressurized bottles or independent compressors must be employed, both of which are undesirable from a cost and efficiency point of view. In an attempt to alleviate this problem, it has been proposed to design the auger or feed screw in the extruder to provide a low pressure area at the entrance port of the blowing agent. This is normally accomplished by reducing the root diameter of the auger flutes, but this in turn significantly increases the cost of this component.

The required high pressure which must be maintained in conventional systems presents an additional problem in that there often is a considerable amount of leakage in the entire system between the extruder and the mold. Also, the rapid expansion of the highly pressurized blowing agent in the mold often causes turbulence in the mixture which in turn gives rise to wrinkles and areas of differing densities in the finished product.

A further difficulty in the conventional process for molding foamable thermoplastic products resides in the inability to satisfactorily distribute the charge from the accumulation chamber to more than one injection port. For example, in filling either multiple molds or a large unitary mold of complicated configuration, it is conventional to discharge the mixture from the accumulation chamber into a manifold for distribution into a series of parallel lines. Each line includes a manually adjustable metering valve such that the charge passing through that line and the associated injection port can be independently controlled. The difficulty in obtaining a proper balance under this system will be readily apparent, since any adjustment or variance in one metering valve will necessarily affect the amount of the charge passing through the other valves. In addition, a slight change in temperature, pressure or composition of the mixture can change the amount of the charge passing through the valves. Thus, a time consuming operation is required to initially set the various valves, and constant readjustment is required to make allowance for changing conditions.

It is accordingly an object of the present invention to provide an improved method and apparatus for molding a foamable thermoplastic material which obviates the above noted disadvantages of the presently employed process.

It is a more specific object of the present invention to provide an apparatus for thoroughly mixing the plastic and blowing agent in an independent mixing chamber maintained at a relatively low pressure and positioned between the extruder and accumulation chamber.

It is another object of the present invention to provide a process of the described type wherein the nitrogen or other blowing agent may be dispensed into the melted plastic at a relatively low pressure, without the need for highly pressurized bottles or an independent compressor, and while employing an extruder auger of conventional uncomplicated design.

It is a further object of this invention to provide a low pressure system for molding foamed thermoplastic articles wherein the above noted problem of turbulence in the mold is effectively alleviated.

It is another object of this invention to provide means for distributing an accumulated charge into a plurality of distribution lines which eliminates the conventionally employed metering valves and which further includes provision for independently and permanently adjusting the charge passing through each line.

These and other objects and advantages of the present invention are achieved in the embodiment of the invention illustrated herein by the provision of an apparatus which includes an extruder for melting a thermoplastic material and conveying it along a path of travel, a mixer positioned in the path of travel for receiving the melted material and mixing a gaseous blowing agent therewith, a plurality of expandable accumulation chambers communicating with the path of travel for receiving the mixture from the mixer, mold means for receiving the mixture from the accumulation chambers, and means for establishing communication between each of the accumulation chambers and the mold means. The extruder is adapted to convey the mixture through the mixer and into the accumulation chambers under a pressure sufficient to preclude premature foaming, and the accumulation chambers each include a translatable piston adapted to selectively apply a significantly increased pressure to the mixture to rapidly force the same into the mold means upon communication being established between the accumulation chambers and mold means.

Some of the objects and advantages of the invention having been stated, others will appear as the description proceeds, when taken in connection with the accompanying drawings, in which FIG. 1 is a schematic representation of an apparatus for molding foamed thermoplastic articles which incorporates the present invention;

FIG. 2 is an enlarged schematic representation of one of the accumulation chambers shown in FIG. 1;

FIG. 3 is a sectional plan view of the mixer of the present invention taken substantially along the line 3—3 of FIG. 1;

FIG. 4 is a sectional end view of the mixer taken substantially along the line 4—4 of FIG. 3.

Referring more specifically to the drawings, an apparatus for molding foamed thermoplastic articles is schematically illustrated in FIG. 1, and includes an extruder 12 of conventional design for melting the thermoplastic material and conveying the same under pressure along a path of travel as hereinafter further described. The extruder includes a hopper 14 for receiving a granulated thermoplastic material, heating means (not shown) for elevating the temperature of the granules to melt the same within the extruder, and an internal auger (not shown) rotatable by the motor 16 to convey the melted mixture under pressure toward the right end of the extruder as seen in FIG. 1. The pressure of the extruded mixture is relatively low, e.g. about 500 psi or less, but is sufficient to preclude premature foaming as further described below.

A mixer 20 is positioned in communication with the open right end of the extruder as shown in FIG. 1 and is adapted to receive the pressurized and melted thermoplastic material and thoroughly mix the same with a gaseous blowing agent. As best seen in FIG. 3, the mixer comprises a tubular wall 22 defining a cylindrical internal passageway, and a port 24 extending through the wall 22 for admitting the blowing agent therethrough. More particularly, the port 24 is connected via the pipe 25 to a source of gaseous blowing agent, such as nitrogen bottles 26 which may be maintained at a suitable pressure, e.g. about 500 psi. This relatively low pressure will be sufficient to cause the nitrogen to enter the mixer and be mixed with the thermoplastic material. As stated above, the pressure of the resulting mixture must be maintained at a level sufficient to preclude foaming, and a pressure of, for example, about 500 psi will be sufficient for this purpose in the case of most conventional thermoplastic materials and blowing agents.

The mixer 20 further includes an auger 28 fixedly positioned in the passageway. More particularly, the auger 28 comprises a central shaft 29 coaxially disposed in the passageway and a flange 30 helically disposed about the shaft, the flange 30 including a first portion 31 of one hand, and a second portion 32 of the opposite hand. Viewing FIG. 4 it will be observed that the flange 30 has a major diameter somewhat less than the internal diameter of the passageway to define a clearance between the periphery of the flange and the internal wall of the mixer. A number of spot welds 34 extend between the periphery of the flange and the mixer wall to fixedly mount the auger 28 therein.

In describing the operation of the mixer, it will be apparent that a first portion of the melted thermoplastic material entering from the left end as seen in FIG. 3 will be directed along a helical path defined by the auger flange portion 31, and a second portion of the material will be directed along a linear path between the periphery of the flange and the mixer to effect a thorough mixing of the melted thermoplastic material with the blowing agent entering at 24 as the material continues along the path of travel. It will also be noted that the second flange portion 32 of the mixer will direct a portion of the mixture along an oppositely directed helical path to further enhance the thorough mixing of the two materials.

From the mixer 20, the melted mixture of the thermoplastic material and blowing agent is conveyed into a manifold 38 which communicates with the parallel lines 40, 41 and 42 leading to the accumulation chambers 44, 45, and 46 respectively. Independent discharge lines 48, 49, and 50 lead from the associated accumulation chamber, through the selective communication means 54, and into the mold means 56. More particularly, each of the discharge lines 48, 49, and 50 is controlled by valves 58, 59, 60 respectively, for establishing communication between the associated accumulation chamber and one of the injection ports 64, 65, and 66. These ports may lead into a single mold of relatively complicated configuration, or into a mold comprising three relatively small separate components.

Each of the valves 58, 59, 60 is of conventional construction, and includes a translatable piston 67 and depending rod 68 positioned to selectively block passage through the respective discharge lines. Each of the rods carry a transverse plate 69 for the purposes hereinafter set forth.

A pneumatic pressure system 70 is provided which includes an air pressure source 71, and each of the valves 58, 59, 60 is controlled by an individual four way valve 72, 73, 74 respectively, and connecting lines 75 and 76 to selectively lift the pistons 67 to establish communication between the respective discharge line and mold, and to depress the pistons to close the communication. The valve 72 is controlled by the solenoids 77 and 78, the valve 73 by solenoids 79 and 80, and the valve 74 by solenoids 81 and 82.

Each of the accumulation chambers 44, 45 and 46 includes a first piston 84 translatable between a lowered position defining an unexpanded chamber and a raised position defining an expanded chamber. A cylindrical piston housing 85 is mounted adjacent each accumulation chamber and carries a second piston 86 mounted for coaxial and corresponding translation with the first piston 84 in the associated accumulation chamber, the two pistons being interconnected by the rod 87. The piston housing 85 defines a first area 88 above the second piston 86 and a second area 89 beneath the same.

A first pressure means 90 communicates with the first area 88 of each piston housing and is adapted to urge the first and second pistons downwardly under a relatively high pressure of, for example, about 2000–3000 psi. In the illustrated embodiment, each first pressure means 90 includes a bottle 91 of pressurized gas such as air or nitrogen, a pipe 92 communicating with the piston housing, and a gauge 93 for observation by the operator of the apparatus. Also, a layer of oil 94 may be positioned above each of the pistons 86 to serve as a seal for the gas in the pressure system.

A second pressure means 100 communicates with the second area 89 of each housing to urge the first and second pistons 84 and 86 upwardly against the force of the means 90. More particularly, the system 100 includes a hydraulic fluid reservoir 102, pump 104, main distribution line 105 having a first valve 106 therein, and three secondary lines 107, 108, and 109 leading to the second area 89 of each housing 85. The valve 106 is controlled by the solenoids 110 and 111 between a first position wherein the pump 104 communicates with the line 105 to deliver pressurized fluid thereinto, and a second position wherein the line 105 communicates with the relief line 112 for dumping into the reservoir 102. The pump is thus designed to selectively maintain an intermediate pressure of, for example, about 500–2500 psi in the line 105.

Each of the secondary lines 107, 108 and 109 includes a ball valve 114, 115 and 116 respectively, which are in turn controlled by the four way pneumatic valves 118, 119, 120 which are connected to the air pressure source 70. Each of the four way valves includes a pair of controlling solenoids numbered 121–122, 123–124, and 125–126 respectively. In addition, the secondary lines each include a manually adjustable metering valve 127 for the purposes hereinafter set forth.

The automatic operation of the apparatus is controlled by a number of limit switches which are mounted in pairs adjacent each accumulation chamber as shown in FIGS. 1 and 2. In particular, each accumulation chamber carries an upper double pole switch 130 which is adjustably attached to a vertical rod 131 to thereby permit vertical adjustment with respect to the accumulation to the chamber as schematically shown in FIG. 2. The lower poles 132 of each switch 130 are connected in series such that closure of each switch 130 is required to initiate the timer 134 as further described below. The upper poles 135 of switches 130 independently actuate the associated solenoid 121, 123, or 125. When these solenoids are actuated, the associated valve 114, 115 or 116 is rotated to the closed position. Solenoids 122, 124 and 126 are employed to re-open these valves as explained below.

A lower double pole switch 138 is mounted immediately below each switch 130, and a contact arm 139 is carried by the rod 87 so as to close one of these switches at each of the raised and lowered positions of the pistons 86 and 84. As will hereinafter become more apparent, the vertical positioning of the switch 130 along the rod 131 will effectively control the volume of the mixture received in the associated accumulation chamber.

As noted above, the timer 134 is actuated upon all of the pistons reaching their raised positions and all of the switches 130 being closed. The timer 134 is a conventional electrical delay circuit of a type well known to those skilled in the art, and is designed to immediately energize the bell 142 to warn the operator of the impending discharge of the accumulation chambers, and to then actuate the solenoids 77, 79, 81, and 111 after a delay period of, for example, about 10 seconds. The solenoids 77, 79, and 81 cause the valves 72, 73, and 74 to direct pressurized air through the lines 75 to simultaneously raise the pistons 67 and thereby establish communication between the accumulation chambers 44, 45, and 46 and the mold 56. The solenoid 111 transfers the valve 106 to its second position wherein the pressurized fluid in line 105 is exhausted. The timer thus acts as a safety feature to give the operator warning of the impending discharge and to permit him to insure that the mold is closed and ready to receive the charge. If desired, a relief or dump valve 144 may be positioned in the manifold 38 to permit discharge of any excess thermoplastic material during this delay period.

The upper poles 146 of switches 138 are connected in series so that when all of these switches are closed, the solenoid 110 of valve 106 will be actuated to return the valve 106 to its first position wherein the pump 104 delivers pressurized fluid to the line 105. Each of the lower poles 147 of switches 138 are independently connected to one of the solenoids 78, 80 or 82. Thus for example, the closing of switch 138 associated with chamber 44 will actuate the solenoid 78 of the appropriate valve 72 to direct the pressure from source 71 into line 76 and thereby depress the piston 67 to close communication through line 48. From the above, it will be apparent that the valves 58, 59 and 60 are opened substantially simultaneously upon all of the accumulation chambers receiving a predetermined amount of the plastic mixture, but these valves are independently closed upon the associated accumulation chamber being exhausted of its predetermined amount of the mixture. This independent closure system is designed to preclude the mixture from one accumulation chamber passing through a previously exhausted chamber and into the wrong discharge line, and thereby assures the proper charge being injected through each of the injection ports.

To further control the timing of the discharge of the thermoplastic material from the accumulation chambers, a switch is provided adjacent each rod 67 which is adapted to be closed by the plate 69 when the rod reaches its upper position. These switches, numbered 150, 151, and 152, are independently connected to the solenoids 122, 124, and 126 respectively, which in turn operate to re-open the ball valves 114, 115, and 116. Thus the second pressure means 100 for each accumulation chamber is independently released upon communication being established with the mold 56.

The operation of the apparatus will now be described in greater detail. With the extruder 12 operating in the conventional manner, the melted thermoplastic material is directed into the mixer 20 at a substantially uniform rate and at a relatively low pressure of, for example, about 500 psi. Nitrogen from the bottles 26, which maintain the gas at a corresponding pressure of about 500 psi, enters the mixer through port 24 and is thoroughly mixed with the thermoplastic material as described above.

From the mixer 20, the mixture is directed into the manifold 38 and through the lines 40, 41 and 42 to the three illustrated individual accumulation chambers 44, 45, and 46. Viewing FIG. 1, it will be observed that the accumulation chambers are being filled in the configuration shown, and that the switches 130 may be positioned at appropriate differing heights to control the charge collected in each accumulation chamber. For example, the switch 130 associated with accumulation chamber 45 is shown at a lower position than the remaining switches. Thus, this switch will close first as the pistons 84 are lifted by the entering mixture, and the closure thereof will actuate the associated solenoid 123 of valve 119 to direct the pressure from the source 71 into the appropriate line for closing the valve 115. Since the line 108 is filled with the hydraulic fluid from the pressure means 100, further upward movement of the pistons 84 and 86 of chamber 45 is effectively precluded. Thus, this chamber can receive no more of the plastic mixture.

When all of the switches 130 are closed, the timer 134 will be actuated to energize the bell 142, and after a ten second delay, to simultaneously actuate solenoids 77, 79, 81 and 111. The first three of these solenoids cause the pistons 67 to lift to establish communication through the lines 48, 49, and 50 to the mold 56, and the solenoid 111 causes the valve 106 to assume its second position for dumping the pressure in line 105. Initially, however, it will be noted that the pressure in areas 89 will not be immediately released by this action since the valves 114, 115, and 116 are closed.

When each rod 67 reaches its upper position, the associated switch 150, 151 or 152 is closed to open the appropriate valve 114, 115, or 116. At this point, the pressure in areas 89 is released, and the pistons 84 and 86 will be rapidly depressed by the high pressure in areas 88 from the first pressure means 90 to thereby rapidly force the mixture from each of the accumulation chambers into the mold. Also, it will be apparent from the above description that the release of the pressure in the areas 89 of the three accumulation chambers will be substantially concurrent but it should be noted that slight differences in the rate at which the pistons 67 are lifted may result in a slight variation in the timing of the discharge from the three chambers.

To summarize the accumulation and discharge steps, the combined action of the first pressure means 90 and the opposing second pressure means 100 will exert a first downward force on the pistons 86 (and thus also pistons 84) sufficient to preclude foaming of the thermoplastic material as it accumulates within the chambers 44, 45 and 46. When the second pressure means 100 is released by the valve means, which includes the valve 106, a second downward force of greater intensity than the first force is applied to the pistons 86 and 84 to rapidly force the mixture from each chamber into the mold. The metering valves 127 may be employed to adjust the speed at which the second pressure means 100 is released and thereby control the speed at which the mixture is forced into the mold. This speed control is often useful in obtaining proper distribution of the charge within the mold.

When all of the pistons 84 reach their predetermined lowered position, lever arms 139 will close poles 146 of switches 138 to actuate solenoid 110 and re-establish pressure in line 105 and thus the area 89 beneath the pistons 86. Also, upon each piston 84 reaching bottom, the lower pole 147 of the associated switch 147 will be closed to the associated solenoid 78, 80 or 82 to direct the pressure from source 71 through lines 76. The piston 67 of the appropriate valve 58, 59 or 60 will thus be depressed to block communication between the mold and accumulation chamber. When all valves 58, 59 and 60 are thus closed, the apparatus will automatically re-cycle in the same manner described above. Meanwhile, the mold may be opened and the part or parts removed.

In the drawings and specification, there has been set forth a preferred embodiment of the invention and although specific terms are employed, they are used in a generic and descriptive sense only and not for purposes of limitation. Also, while the disclosed embodiment shows three separate accumulation chambers, it will be understood that the novel features of the present invention will be applicable to an apparatus having one, two, or four or more such chambers.

That which is claimed is:

1. An apparatus for molding foamed thermoplastic articles comprising
   accumulation means including an expansible and contractable chamber for receiving a predetermined amount of a mixture of thermoplastic material and blowing agent therein,
   means for heating thermoplastic material and for mixing the thermoplastic material and a blowing agent and for conveying the resulting mixture under a first pressure sufficient to preclude the premature foaming thereof into said expansible and contractable chamber in said accumulation means,
   mold means connected to said accumulation means for receiving the mixture of thermoplastic material and blowing agent from said accumulation means under conditions of reduced pressure to permit the foaming of the mixture received therein, and
   means connected to said accumulation means for applying an expansion resisting pressure to said chamber during the receipt of the mixture therein to maintain the mixture under said first pressure in said chamber, and for applying a contracting pressure considerably higher than said expansion resisting pressure to said chamber to rapidly discharge the mixture from the accumulation means into said mold means.

2. The apparatus as defined in claim 1, wherein said expansible and contractable chamber includes a piston translatable between a first position defining an unexpanded chamber and a second position defining an expanded chamber, and wherein said means for applying pressure to said chamber applies a first force on said piston resisting movement of said piston from said first to said second position and selectively applies a second force of greater intensity than said first force for moving said piston from said second position to said first position.

3. The apparatus as defined in claim 2 wherein said pressure applying means continuously applies said second force to said piston during both the receipt and discharge of the mixture into and from said chamber and includes means for selectively applying force to said piston in opposition to said second force during the receipt of material into said chamber, said opposition force being of less value than said second force so that said first force applied to the piston is a resultant force defined by said second force less said opposition force.

4. The apparatus as defined in claim 2 including means for establishing communication between said accumulation means and said mold means substantially concurrently upon application of said contracting pressure to said chamber.

5. An apparatus for molding foamed thermoplastic articles comprising
   accumulation means including a plurality of expansible and contractable chambers for receiving a predetermined amount of a mixture of thermoplastic material and blowing agent therein,
   means for heating thermoplastic material and for mixing the thermoplastic material and a blowing agent and for conveying the resulting mixture under a first pressure sufficient to preclude the premature foaming thereof into each of said expansible and contractable chambers in said accumulation means, mold means connected to each of said chambers in said accumulation means for receiving the mixture of thermoplastic material and blowing agent from said accumulation means under conditions of reduced pressure to permit the foaming of the mixture received therein, and means connected to said accumulation means for applying an expansion resisting pressure to each of said chambers during the receipt of the mixture therein to maintain the mixture under said first pressure in said chamber, and for applying a contracting pressure to said chamber to rapidly discharge the mixture from each of said chambers into said mold means.

6. The apparatus as defined in claim 2 wherein said piston is translatable between a lowered position defining an unexpanded chamber and a raised position defining an expanded chamber, said means for applying said first and second forces on said piston comprises first pressure means for urging said piston from its raised position to its lowered position to apply said second force through said piston to said mixture, second pressure means of a value less than said first pressure means for urging said piston from its lowered position to its raised position in opposition to said first pressure means to apply said first force through said piston to said mixture when acting in concert with said first pressure means, and means for selectively releasing said second pressure means while maintaining said first pressure means.

7. The apparatus as defined in claim 6 further including means for adjusting the raised position of said piston whereby the volume of the mixture adapted to be received in said chamber may be varied.

8. The apparatus as defined in claim 5 including means for establishing communication between each of said chambers and said mold means comprising an independent line extending from each accumulation chamber and terminating in an injection port, and means for independently terminating communication through each of said independent lines upon the associated accumulation chamber being exhausted of its predetermined amount of the mixture.

9. The apparatus as defined in claim 8 wherein said mold means comprises a single cavity, and each of said injection ports communicates with said cavity at spaced locations.

10. The apparatus as defined in claim 8 wherein said mold means comprises a plurality of separate cavities, and each of said injection ports communicates with a separate one of said cavities.

11. The apparatus as defined in claim 8 wherein each of said accumulation chambers includes a translatable piston and said means for maintaining the received mixture under pressure and for forcing the mixture from each of said accumulation chambers includes means for applying a first force on each of said pistons and for selectively applying a second force of greater intensity than said first force on each of said pistons.

12. The apparatus as defined in claim 11 further including means for independently adjusting at least one of the limits of translation for each piston whereby the volume of the accumulation chambers may be independently varied.

* * * * *